(12) United States Patent
Willinger

(10) Patent No.: US 6,306,329 B1
(45) Date of Patent: *Oct. 23, 2001

(54) METHOD OF MOLDING GARMENT HANGER CLIP

(75) Inventor: Jonathan Willinger, Tenafly, NJ (US)

(73) Assignee: Randy Hangers, East Rutherford, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,395

(22) Filed: Aug. 11, 1998

(51) Int. Cl.⁷ .............................. B29C 45/16; A47G 25/48
(52) U.S. Cl. ........................ 264/255; 264/259; 264/267; 264/273; 264/274; 24/482; 24/531; 223/91
(58) Field of Search ..................................... 264/255, 259, 264/273, 274, 267; 223/91; 24/481, 482, 530, 531, 564

(56) References Cited

U.S. PATENT DOCUMENTS

| 508,060 | * 11/1893 | Kanai et al. ........................ 264/255 |
| 2,931,110 | * 4/1960 | Pietrocola ............................... 36/30 |
| 3,522,345 | * 7/1970 | Olsen ..................................... 264/273 |
| 3,767,092 | 10/1973 | Garrison et al. ........................ 223/96 |
| 4,419,274 | 12/1983 | Garrison ................................. 24/248 |
| 4,711,621 | * 12/1987 | Schomblond ........................ 425/120 |
| 4,722,120 | 2/1988 | Lu ........................................... 24/489 |
| 4,759,480 | 7/1988 | Duester et al. ......................... 223/96 |
| 5,020,705 | 6/1991 | Garrison ................................. 226/96 |
| 5,160,474 | * 11/1992 | Huff ...................................... 264/255 |
| 5,183,191 | 2/1993 | Garrison et al. ........................ 223/96 |
| 5,516,014 | 5/1996 | Garrison ................................. 223/96 |
| 5,814,252 | * 9/1998 | Gouldson et al. ................... 264/40.5 |
| 5,861,120 | * 1/1999 | Yagi et al. ............................ 264/255 |
| 5,890,634 | * 4/1999 | Zuckerman et al. ................... 223/96 |
| 5,922,263 | * 7/1999 | Endo et al. ........................... 264/255 |

* cited by examiner

Primary Examiner—Jan H. Silbaugh
Assistant Examiner—Suzanne E. McDowell
(74) Attorney, Agent, or Firm—Helfgott & Karas, P.C.

(57) ABSTRACT

A method of molding a clamping garment clip for use on a hanger comprising the steps of molding a pair of support clamp arms with a first plastic material, molding a pair of support pads to said pair of support clamp arms with a second plastic material and forming mechanical interlocks between said support arms and said support pads exclusively by molded mechanical connections between said first and second plastic materials.

2 Claims, 3 Drawing Sheets

METHOD OF MOLDING GARMENT HANGER CLIP

BACKGROUND OF THE INVENTION

1. Field of the Invention

The present invention relates in general to a plastic clip molded onto a garment hanger and in particular to such a clip having soft resilient pads molded of a separate plastic material and aligned for planar interengagement.

2. Description of Prior Developments

Garment hangers having molded plastic clips are well known and available in numerous forms. An example of such a hanger and clip is shown in U.S. Pat. No. 5,516,014 wherein a hanger and clip are homogeneously molded of one plastic material and a gripping pad formed of second plastic material is subsequently fused to the clip. A U-shaped spring clip is used to manually lock and release the clip jaws about a garment.

Although such conventional clips perform adequately, they can and do slip off a garment. One reason for such slippage is believed to be the relatively limited gripping area between the pads on the garment clips and the garments. That is, conventional garment pads are formed with a uniform thickness and are mounted or bonded to their clips in the manner of a pair of pincers.

More particularly, the pads are typically spaced apart from one another at their upper ends and converge or taper toward each other and contact each other at their lower ends. This results in a single line of limited contact along the lower ends of the pads and provides a single line of gripping pressure on a garment. Accordingly, a need exists for a garment clip which provides an increased gripping area. A further need exists for a garment hanger clip which can be co-molded simultaneously with a resilient plastic gripping pad which is held to the clip with a mechanical connection.

Another need exists for a garment clip having gripping pads which do not taper toward one another and which, when closed, engage one another with a substantially planar contact surface or gripping interface.

SUMMARY OF THE INVENTION

The present invention has been developed to fulfill the needs noted above and therefore has as an object the provision of a semi-rigid plastic garment hanger clip which is co-molded with gripping pads formed of a separate soft plastic material.

Another object of the invention is the provision of a garment hanger clip having a pair of gripping pads which engage one another with substantially planar contact.

Yet another object of the invention is the provision of a garment hanger clip having at least one wedge-shaped support surface for providing substantially planar alignment and contact between a pair of gripping pads.

Still another object of the invention is the provision of a tapered gripping pad for a garment clip. The pad includes a thick top portion and a thin bottom portion for providing substantially planar alignment and contact between a pair of gripping pads.

Another object of the invention is the provision of a garment clip co-molded with a gripping pad in such a manner that a purely mechanical, non-adhesive interlock is formed between the clip and pad without forming a bond or fused interface between the clip and pad.

These and other objects are met by the present invention which is directed to a garment hanger having a pair of plastic garment hanger clips which is simultaneously co-molded with two pairs of gripping pads formed of a separate plastic material. The pads are connected to the clips with a simple mechanical connection without the use of any adhesive and without forming a fused interface between the clips and pads.

Added gripping effectiveness is provided by aligning the gripping pads in such a manner that the pads, upon closing, engage one another with a substantially planar contact. This planar contact can be achieved either by forming the pads with a wedge-shaped or tapered profile or by forming one or both of the pads with a uniform profile and forming the clips with a pair of pad support surface which align substantially parallel with one another when the pads close together against each other.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawings, like reference characters designate like parts.

DETAILED DESCRIPTION OF THE PREFERRED EMBODIMENTS

Figure 1:
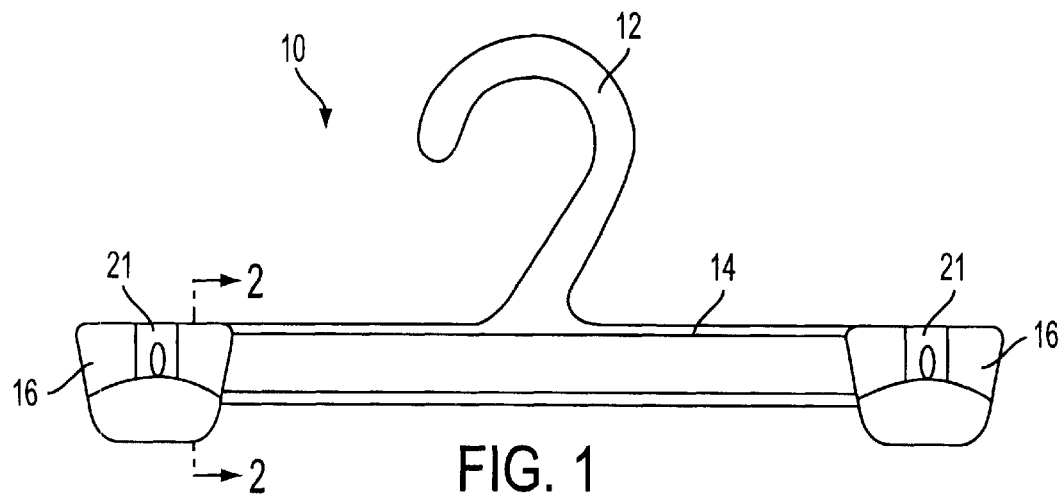
FIG. 1 is a front elevation view of a garment hanger having a pair of garment clips constructed according to a prior art design.
Figure 2:
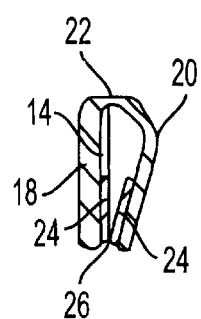
FIG. 2 is a view in section through line 2—2 of FIG. 1.

In order to better appreciate the advantages of the present invention, a brief discussion of the prior art garment hanger of FIGS. 1 and 2 should be illustrative. As seen in FIGS. 1 and 2, a garment hanger 10 is formed as a plastic molding having a plastic hook 12, a plastic support bar 14 and a pair of plastic garment clips 16. Each garment clip 16 includes an inner clamp arm 18 fixedly molded to support bar 14 and an outer or free clamp arm 20 which is pivoted to arm 18 by a molded living hinge 22. A U-shaped spring clip 21 slides up and down over arms 18, 20 to lock and release the arms around a garment.

As further seen in FIG. 2, each arm 18, 20 has a soft pad 24 molded, fused or bonded to it. Pads 24 are identical in size and shape, and due to the shape and construction of clips 16, the pads engage one another at their lower end portions about a generally single line of contact 26. In some cases, this limited contact or clamp line is insufficient for securely holding a garment between arms 18, 20.

Figure 3:
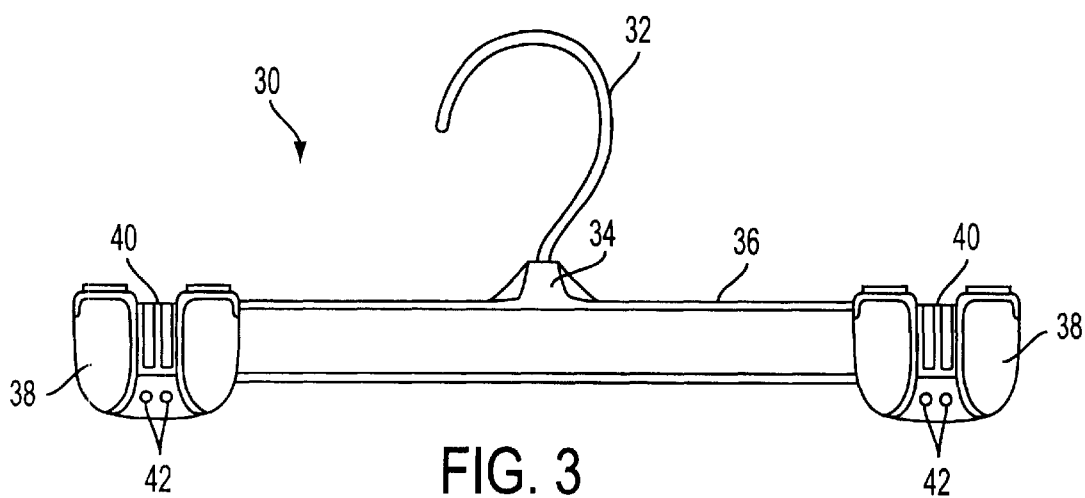
FIG. 3 is a front elevation view of a garment hanger having a pair of garment clips constructed in accordance with the invention.

In order to overcome this drawback, the hanger 30 of FIG. 3 has been developed in accordance with the invention. Hanger 30 includes a wire hook 32 rotatably held within a plastic journal 34 which is integrally molded on plastic support bar 36. A significant feature of the invention is the construction of plastic garment clips 38 which are integrally and homogeneously molded on the opposite ends of support bar 36.

As shown in FIG. 3, each clip 38 includes a U-shaped spring clip 40 which functions the same as clip 21 noted above. Although the gripping pads are not seen in FIG. 3, their mounting nibs 42 are shown. As discussed in more detail below, nibs 42 form a purely mechanical connection between the pads and arms and thereby obviate the use of adhesives and relatively complex bonding, fusing and molding techniques to seat the pads on the arms.

Figure 4:
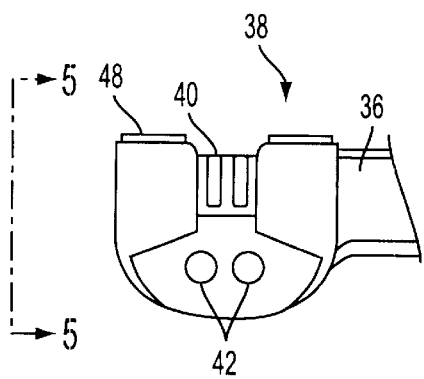
FIG. 4 is a view in fragment of a garment clip constructed in accordance with a second embodiment of the invention.
Figure 5:
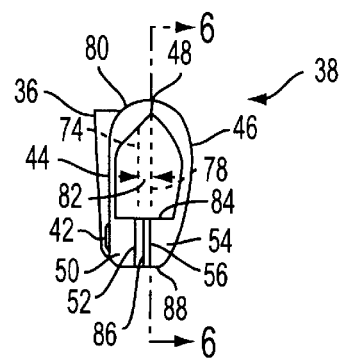
FIG. 5 is a left end view of the clip of FIG. 4 taken along line 5—5 of FIG. 4.

FIG. 4 shows a clip 38 which is functionally the same as that shown in FIG. 3 except for minor surface design variations. As seen in FIG. 5, an inner clamp arm 44 is molded and fixed to support bar 36. A free or outer clamp arm 46 is pivotally connected to the inner arm 44 and to support bar 36 by a living hinge 48.

An inner or first pad support base 50 is molded and formed on the bottom or lower end of the inner arm 44 for receiving and holding a first or inner support pad 52. An outer or second pad support base 54 is molded and formed on the bottom or lower end of the outer arm 46 for receiving and holding a second or outer support pad 56.

Each clip 38 and preferably each support bar 36 is molded from a first plastic material such as a styrene type plastic. Each pad 52, 56 is preferably simultaneously co-molded with each clip and support bar with a second plastic material such as an olefin type plastic. By using this selection of plastic materials, the pads 52, 56 will not fuse or bond with the clips 38. However, olefin and styrene plastics will flow with respect to one another and can therefore be simultaneously molded as separable components.

It should be appreciated that other combinations of plastic materials could also be used such as PVC or K Resin and others.

Figure 6:
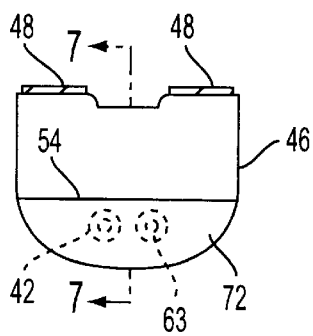
FIG. 6 is a view of the inner face of the outer free clip arm of FIG. 5 taken along line 6—6 of FIG. 5.
Figure 7:
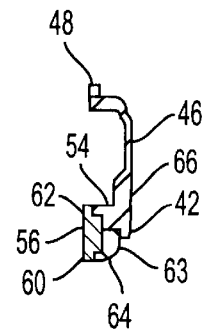
FIG. 7 is a view in section of the clamp arm of FIG. 6 taken through line 7—7 of FIG. 6.
Figure 8:
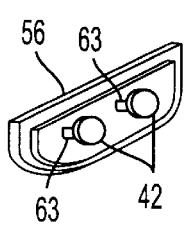
FIG. 8 is a perspective view of the outer face of the pad of FIG. 7.

Since olefin and styrene plastics do not fuse or bond when co-molded, a supplemental connection in the form of a mechanical interlock is provided by nibs 42. As seen in FIGS. 6, 7 and 8, the second or outer pad 56 is molded into a shallow pocket 60 (FIG. 7) formed in the central portion of the outer support base 54. The construction of the inner clamp arm, support base, and retention of the inner pad on the inner support base is essentially the same of that of the corresponding structure of the outer clamp arm, support base and outer pad retention.

An opening or lateral flow channel 62 is formed through the side wall 64 of the outer support base 54 to allow the olefin type plastic which forms pad 56 to flow through the side wall 64 and flow over its outer surface 66. The olefin plastic which flows through opening 62 subsequently hardens into a neck or stalk 63 extending through opening 62.

The flowing olefin plastic is constrained within a small circular or button shaped mold recess located around the flow channel 62 on the outer surface of side wall 64 so as to form a locking nib 42. Flow channels are provided in the mold in the form of tubes to allow the olefin to flow through the styrene via openings 62 and form the nibs 42.

Nib 42 may take any shape as long as it provides a resistance to the removal of pad 56 from support base 54. In fact, flow channel 62 could be formed with an outwardly flaring or tapering cross section such as a triangular cross section so as to form nib 42 completely within a complimentary shaped flow channel. In the example shown in FIG. 7, nib 42 is formed as a circular cap similar to a nail head.

Although not shown, the inner pad 52 is tightly held to the inner support base 50 in the same manner as the outer pad 56 is tightly held to the support base 54, i.e. with one or more co-molded mechanically interlocking nibs 42. It should be noted that if the nibs or enlarged heads 42 of either pad 52, 56 are cut off, the remaining olefin pads can be easily removed from pockets 60 and may actually fall away by their own weight. This emphasizes the nature of the purely mechanical interlock provided by nibs 42.

Figure 9:
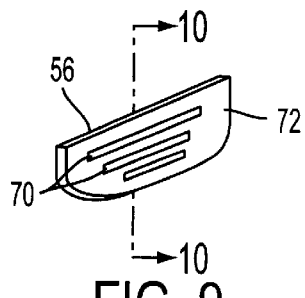
FIG. 9 is a perspective view of the inner face of the pad of FIG. 8.
Figure 10:
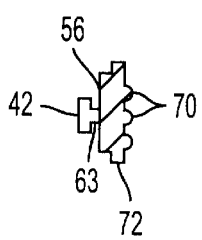
FIG. 10 is a view in section through line 10—10 of FIG. 9.
Figure 11:
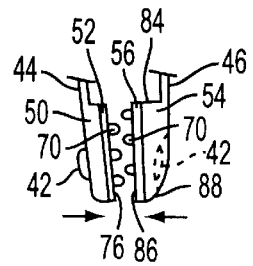
FIG. 11 is a fragmental view of another embodiment of the invention having a pair of pads with interlocking ribs.

As seen in FIGS. 9, 10 and 11, one or more gripping ribs 70 may be molded along the inner face 72 of one or both gripping pads 52, 56. Ribs 70 provide increased gripping pressure and enhance the retention of a garment clipped between the pads. As seen in FIG. 11, the ribs on one pad can be offset from those on the other pad to create a tongue and groove or interdigitated interfit between the opposing ribs 70.

Another significant feature of the invention is the substantially parallel alignment of the inner garment gripping surfaces of the garment pads when the clip 38 is closed by spring 40. Such parallel alignment of the engaged pads provides a substantially planar contact surface between the opposed pads 52, 56 and between the pads and a garment clamped between them.

Figure 12:
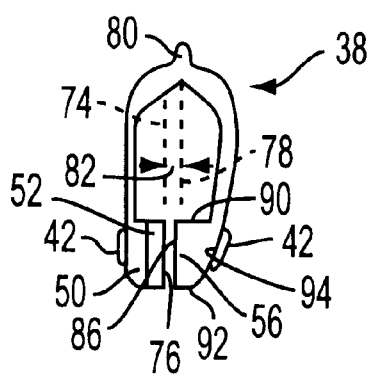
FIG. 12 is a view similar to FIG. 5 depicting another embodiment of the invention.

As seen in FIGS. 5 and 12, the vertical plane 74 which extends over the flat inner face 76 of the inner pad 52 is laterally or horizontally displaced or transversely offset from the generally parallel vertical plane 78 which passes through the pivot axis 80 of hinge 48. This displacement, represented by spacing 82, while advantageous for the clamping action of the clip 38, can result in the generally undesirable single line contact 26 shown in FIG. 2.

In order to reduce or prevent such limited single line contact, the present invention provides two separate solutions. The first solution is to form one of the support bases 50, 54 with a downwardly tapering cross section so that the top portion of the support base is wider or thicker than the bottom portion. This approach is taken with the clips 38 of FIGS. 5 and 11, wherein the upper portion 84 of the outer support base 54 is thicker or wider in a direction perpendicular to the inner face 86 of the outer pad 56, than is the bottom portion 88 of support base 54.

This particular tapered or wedge-shaped support base 54 is formed with its upper portion wider than its lower portion by an amount about equal to the spacing 82 noted above to bring the outer pad 56 into parallel and planar alignment with the inner pad 52.

Figure 13:
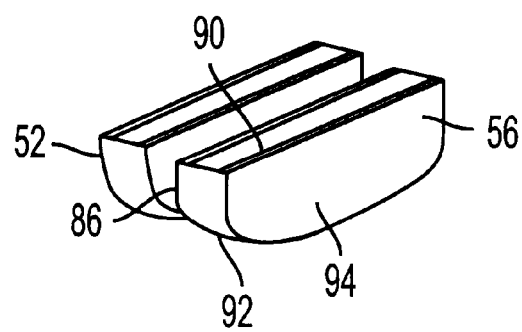
FIG. 13 is a perspective view of the pads of FIG. 12.

This parallel spacing or planar alignment between the inner and outer pads 52, 56 can also be achieved by forming the upper portion of at least one of the gripping pads with a greater transverse width or horizontal thickness than its bottom portion. This second solution is represented in FIGS. 12 and 13 wherein the top portion 90 of the outer pad 56 is formed wider than its lower portion 92 by an amount about equal to spacing 82. This exact amount of spacing is not always required, as some compensation for misalignment between the pads can be achieved by the shape and contour of the outer arm 46. In fact, a combination of the first approach or solution with this second approach or solution can provide satisfactory results.

This second design approach results in the outer pad 56 having a somewhat wedge shaped cross section with its outer surface 94 tapering downwardly towards its inner surface 86.

There has been disclosed heretofore the best embodiment of the invention presently contemplated. However, it is to be understood that various changes and modifications may be made thereto without departing from the spirit of the invention.

What is claimed is:

1. A method of molding a clamping garment clip for use on a hanger with different plastic materials, wherein said method comprises:

molding a pair of support clamp arms with a first plastic material;

molding a pair of support pads to said pair of support clamp arms with a second plastic material;

forming gripping ribs on at least one of said support pads; and forming mechanical interlocks between said support clamp arms and said support pads exclusively by molded mechanical connections between said first and second plastic materials;

wherein each of said support clamp arms has a front surface and a rear surface and wherein said each of said pair of support pads extends between said front surface and said rear surface of each of said support clamp arms.

2. The method of claim 1, wherein said gripping ribs are formed on both support pads and are offset from each other.

* * * * *